United States Patent
Peng et al.

(10) Patent No.: US 9,741,339 B2
(45) Date of Patent: Aug. 22, 2017

(54) DATA DRIVEN WORD PRONUNCIATION LEARNING AND SCORING WITH CROWD SOURCING BASED ON THE WORD'S PHONEMES PRONUNCIATION SCORES

(71) Applicant: Google Inc., Mountain View, CA (US)

(72) Inventors: Fuchun Peng, Cupertino, CA (US); Francoise Beaufays, Mountain View, CA (US); Brian Strope, Palo Alto, CA (US); Xin Lei, Sunnyvale, CA (US); Pedro J. Moreno Mengibar, Jersey City, NJ (US); Trevor D. Strohman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 638 days.

(21) Appl. No.: 13/930,495

(22) Filed: Jun. 28, 2013

(65) Prior Publication Data
US 2015/0006178 A1    Jan. 1, 2015

(51) Int. Cl.
*G10L 15/00*    (2013.01)
*G09B 5/00*    (2006.01)
*G10L 15/14*    (2006.01)
*G10L 15/18*    (2013.01)
*G10L 13/08*    (2013.01)
(Continued)

(52) U.S. Cl.
CPC .............. *G10L 15/18* (2013.01); *G10L 13/08* (2013.01); *G10L 15/06* (2013.01); *G09B 17/006* (2013.01)

(58) Field of Classification Search
CPC ........ G10L 15/06; G10L 17/26; G09B 17/006
USPC ................................ 704/236, 256.2; 434/169
See application file for complete search history.

(56) References Cited

U.S. PATENT DOCUMENTS

| | | | |
|---|---|---|---|
| 7,266,495 B1 * | 9/2007 | Beaufays | G10L 15/06 704/236 |
| 2008/0147404 A1 * | 6/2008 | Liu | G10L 17/26 704/256.2 |
| 2010/0145704 A1 | 6/2010 | Conkie et al. | |

(Continued)

OTHER PUBLICATIONS

International Search Report and Written Opinion in International Application No. PCT/US2014/031884, mailed on Jul. 25, 2014, 9 pages.

(Continued)

*Primary Examiner* — Farzad Kazeminezhad
(74) *Attorney, Agent, or Firm* — Fish & Richardson P.C.

(57) ABSTRACT

Methods, systems, and apparatus, including computer programs encoded on a computer storage medium, for determining pronunciations for particular terms. The methods, systems, and apparatus include actions of obtaining audio samples of speech corresponding to a particular term and obtaining candidate pronunciations for the particular term. Further actions include generating, for each candidate pronunciation for the particular term and audio sample of speech corresponding to the particular term, a score reflecting a level of similarity between of the candidate pronunciation and the audio sample, wherein the said score for the particular term is obtained by using a minimum of individual scores of phonemes comprising the term. Additional actions include aggregating the scores for each candidate pronunciation and adding one or more candidate pronunciations for the particular term to a pronunciation lexicon based on the aggregated scores for the candidate pronunciations.

8 Claims, 4 Drawing Sheets

(51) Int. Cl.
*G10L 15/06* (2013.01)
*G09B 17/00* (2006.01)

(56) References Cited

U.S. PATENT DOCUMENTS

2013/0059276 A1* 3/2013 Allen .................. G09B 5/065
434/167
2013/0295535 A1* 11/2013 Levy ................... G09B 17/006
434/169

OTHER PUBLICATIONS

Peng et al., "Search results based N-best hypothesis rescoring with maximum entropy classification," in Proceedings of ASRU, Dec. 8-12, 2013, 422-427.
Schalkwyk et al., "Google Search by Voice: A case study," Advances in Speech Recognition: Mobile Environments, Call Centers and Clinics, 2010, 1-35.
Bisani et al., "Joint-sequence models for grapheme-to-phoneme conversion," Speech Communications, 50(5):434-451, 2008.
Callison-Burch et al., "Creating speech and language data with amazon's mechanical turk," in Proceedings of the NAACL HLT 2010 Workshop on Creating Speech and Language Data with Amazon's Mechanical Turk, ser. CSLDAMT '10, 2010, 1-12.
Snow et al., "Cheap and fast—but is it good?: evaluating non-expert annotations for natural language tasks," in Proceedings of EMNLP, 2008, 254-263.
Fosler et al., "Automatic learning of word pronunciation from data," in JHU/CLSP Workshop Project Report, 1996, 2 pages.
Beaufays et al., "Learning linguistically valid pronunciations from acoustic data," in Proceedings of EuroSpeech, 2003, 4 pages.
McGraw et al., "Learning lexicons from speech using a pronunciation mixture model," IEEE Transactions on Audio, Speech, and Language Processing, 21(2):357-366, Feb. 2013.
Lu et al., "Acoustic data-driven pronunciation lexicon for large vocabulary speech recognition," in in proceedings of ASRU, 2013, 6 pages.
Li et al., "Adapting grapheme-to-phoneme conversion for name recognition," in Proceedings of ASRU, 2007, 130-135.

Lei et al., "Data-driven lexicon expansion for mandarin broadcast news and conversation speech recognition," in Proc. ICASSP, 2009, 4 pages.
Laurent et al., "Iterative filtering of phonetic transcriptions of proper nouns," in Proceedings of ICASSP, 2009, 4265-4268.
Laurent et al., "Acoustics-based phonetic transcription method for proper nouns," in Proceedings of InterSpeech, Sep. 26-30, 2010, 2286-2289.
Novotney et al., "Shared Task: Crowdsourced Accessibility Elicitation of Wikipedia Articles," in Proceedings of the NAACL HLT 2010 Workshop on Creating Speech and Language Data with Amazon's Mechanical Turk, 2010, 41-44.
McGraw et al., "Collecting voices from the cloud," in LREC, 2010, 8 pages.
Gelas et al., "Developments of Swahili resources for an automatic speech recognition system," in SLTU-Workshop on Spoken Language Technologies for Under-Resourced Languages, 2012, 8 pages.
Vanhoucke et al., "Multiframe deep neural networks for acoustic modeling," in Proceedings of ICASSP, 2013, 4 pages.
Mohri et al., "Weighted finite-state transducers in speech recognition," Computer Speech and Language, 16(1):69-88, 2002.
Badr, Ibrahim, " Pronunciation learning for automatic speech recognition," MIT, Masters thesis, Jun. 2011, 101 pages.
Beaufays, Francoise et al. "Learning Linguistically Valid Pronunciations from Acoustic Data," Proceedings of Eurospeech 2003, 4 pages.
Bisani, Maximilian et al, "Joint-sequence models for grapheme-to-phoneme conversion," Speech Communication, vol. 50, Issue 5, May 2008, 42 pages.
Lei, Xin et al. "Data-Driven Lexicon Expansion for Mandarin Broadcast News and Conversation Speech Recognition," IEEE Proceedings on Acoustics, Speech and Signal Processing, 2009, 4 pages.
Li, Xiao et al, "Adapting grapheme-to-phoneme conversion for name recognition," IEEE Workshop on Automatic Speech Recognition & Understanding, 2007, 6 pages.
International Preliminary Report on Patentability in International Application No. PCT/US2014/031884, mailed Jan. 7, 2016, 7 pages.

* cited by examiner

DATA DRIVEN WORD PRONUNCIATION LEARNING AND SCORING WITH CROWD SOURCING BASED ON THE WORD'S PHONEMES PRONUNCIATION SCORES

TECHNICAL FIELD

This disclosure generally relates to speech recognition.

BACKGROUND

Automated speech recognition systems may attempt to match speech inputs with known pronunciations of terms. When a match is identified, the automated speech recognition system may output, as a transcription of the speech input, the particular term whose known pronunciation matched the speech input.

SUMMARY

In general, an aspect of the subject matter described in this specification may involve a process for determining pronunciations for particular terms. The pronunciations may be descriptions of the sounds corresponding to speaking the particular term. For example, the system may include a pronunciation of "KER-NEL" for the term "COLONEL." The system may store the pronunciations in a pronunciation lexicon. The pronunciation lexicon may be used for recognizing terms in an utterance. For example, an automated speech recognition system may determine that the sound "KER-NEL" in an utterance from a user matches the sound described by the pronunciation for the term "COLONEL" stored in the pronunciation lexicon, and accordingly transcribe the sound as "COLONEL."

However, the system may lack a suitable pronunciation for one or more terms. For example, a pronunciation for a particular term may be missing, e.g., no pronunciation for the particular term is included in the pronunciation lexicon, or the system may include a pronunciation for a particular term that is rarely used, e.g., the pronunciation for the particular term in the pronunciation lexicon is incorrect. Accordingly, the system may identify particular terms lacking a suitable pronunciation and determine one or more pronunciations for the particular terms.

Once the system identifies particular terms to determine pronunciations for the particular terms, the system may obtain audio samples of speech corresponding to the particular terms and generate candidate pronunciations for the particular terms. The candidate pronunciations may describe different sounds for different pronunciations of the particular term. The system may generate the candidate pronunciations based on one or more rules for pronouncing the letters in the particular terms.

The system may then score the level of similarity between the candidate pronunciations generated for the particular terms and the audio samples for the particular terms. The score for a particular candidate pronunciation and a particular audio sample pair may represent how closely the sound described by the particular candidate pronunciation matches the sound in the audio sample.

The system may aggregate the scores for each candidate pronunciation. For example, for a particular candidate pronunciation, the system may average the scores for all the audio samples. The system may then add one or more of the candidate pronunciations to the pronunciation lexicon based on the aggregated scores for the candidate pronunciations. For example, the system may add only the candidate pronunciation that has the aggregated score that indicates the closest level of similarity, or add all of the candidate pronunciations along with their aggregated scores. Alternatively, the system may determine that no candidate pronunciation has an aggregated score that is suitable and generate additional candidate pronunciations to score.

In some aspects, the subject matter described in this specification may be embodied in methods that may include the actions of obtaining audio samples of speech corresponding to a particular term and obtaining candidate pronunciations for the particular term. Further actions may include generating, for each candidate pronunciation for the particular term and audio sample of speech corresponding to the particular term, a score reflecting a level of similarity between the candidate pronunciation and the audio sample. Additional actions may include aggregating the scores for each candidate pronunciation and adding one or more candidate pronunciations for the particular term to a pronunciation lexicon based on the aggregated scores for the candidate pronunciations.

Other versions include corresponding systems, apparatus, and computer programs, configured to perform the actions of the methods, encoded on computer storage devices.

These and other versions may each optionally include one or more of the following features. For instance, in some implementations, adding one or more candidate pronunciations for the particular term may include identifying a candidate pronunciation of the candidate pronunciations with an aggregated score that indicates a closer level of similarity between the candidate pronunciation and the audio samples than levels of similarity between the other candidate pronunciations and the audio samples, and adding the identified candidate expression to the pronunciation lexicon.

In additional aspects, adding one or more candidate pronunciations for the particular term may include adding all candidate pronunciations and the aggregated scores for the candidate pronunciations to the pronunciation lexicon.

In some implementations, obtaining the candidate pronunciations for the particular term may include generating the candidate pronunciations for the particular term based on letters in the particular term and one or more rules for pronunciation.

In certain aspects, obtaining the candidate pronunciations for the particular term may include obtaining a previous set of candidate pronunciations for the particular term and generating, for each candidate pronunciation of the particular term in the previous set and audio sample of speech corresponding to the particular term, a score reflecting a level of similarity between the candidate pronunciation of the previous set and the audio sample. Obtaining the candidate pronunciations for the particular term may further include aggregating the scores for each candidate pronunciation of the previous set, determining that no aggregated score for a candidate pronunciation of the previous set reflects a level of similarity between the candidate pronunciation and the audio samples that is closer than levels of similarity between the other candidate pronunciations by a predetermined amount, and obtaining the candidate pronunciations based on the candidate pronunciation with the aggregated score that indicates a closer level of similarity between the candidate pronunciation and the audio samples than between the other candidate pronunciations and the audio samples.

In additional aspects, obtaining audio samples may include accessing query transcription logs, identifying the particular term in the query transcription logs, and identifying one or more portions of query audio logs corresponding to the identified particular term in the query transcription logs as the audio samples.

In some implementations, obtaining audio samples may include receiving audio samples of multiple different people speaking the particular term in response to a prompt to speak the particular term.

In certain aspects, the actions further include determining the pronunciation lexicon does not include an accurate pronunciation for the particular term, where obtaining audio samples of speech corresponding to a particular term is in response to determining the pronunciation lexicon does not include an accurate pronunciation for the particular term.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

An automated speech recognition (ASR) system may recognize speech using a pronunciation lexicon that includes pronunciations for particular terms. The pronunciations may associate sounds with the particular terms. However, the automated speech recognition system may be unable to accurately recognize speech corresponding to a particular term if the particular term is missing from the pronunciation lexicon or the pronunciation lexicon includes an inaccurate pronunciation for the particular term.

Accordingly, a system may be used to determine pronunciations for particular terms. The system may initially identify particular terms for which the pronunciation lexicon does not include an accurate pronunciation. For example, the system may identify words that are not included in the pronunciation lexicon or analyze ASR logs to identify words that are transcribed incorrectly by the automated speech recognition system, e.g., identify terms for which users correct initial transcriptions.

Regardless of how the particular terms for determining a pronunciation are identified, the system may obtain audio samples of speech corresponding to the particular terms from different people. For example, the system may prompt different users to speak a particular term and use recordings of the users speaking the particular term as the audio samples for the particular term. Additionally or alternatively, the system may analyze transcriptions of voice query logs from different users to identify when the particular term is used in voice queries and use the corresponding portions of recordings of the voice queries as the audio samples.

The system may also obtain candidate pronunciations for particular terms. The system may analyze the letters, graphemes, or other units in the particular terms and apply one or more rules for pronouncing the letters to generate candidate pronunciations that represent alternative potential pronunciations for how the particular term may sound.

The system may generate scores reflecting a level of similarity between the candidate pronunciations and audio samples and aggregate the scores for each candidate pronunciation. The similarity may also be referred to as a fit or an acoustic similarity. For example, for a particular candidate pronunciation, the system may average the scores for all the audio samples.

The system may then add one or more of the candidate pronunciations to the pronunciation lexicon based on the aggregated scores for the candidate pronunciations. For example, the system may add only the candidate pronunciation that has the aggregated score, that indicates the closest level of similarity between the candidate pronunciations and the audio samples, to the pronunciation lexicon, or add all of the candidate pronunciations along with their aggregated scores. Alternatively, the system may determine that no candidate pronunciation has an aggregated score that is suitable and generate additional candidate pronunciations to score and possibly add to the pronunciation lexicon.

Figure 1:
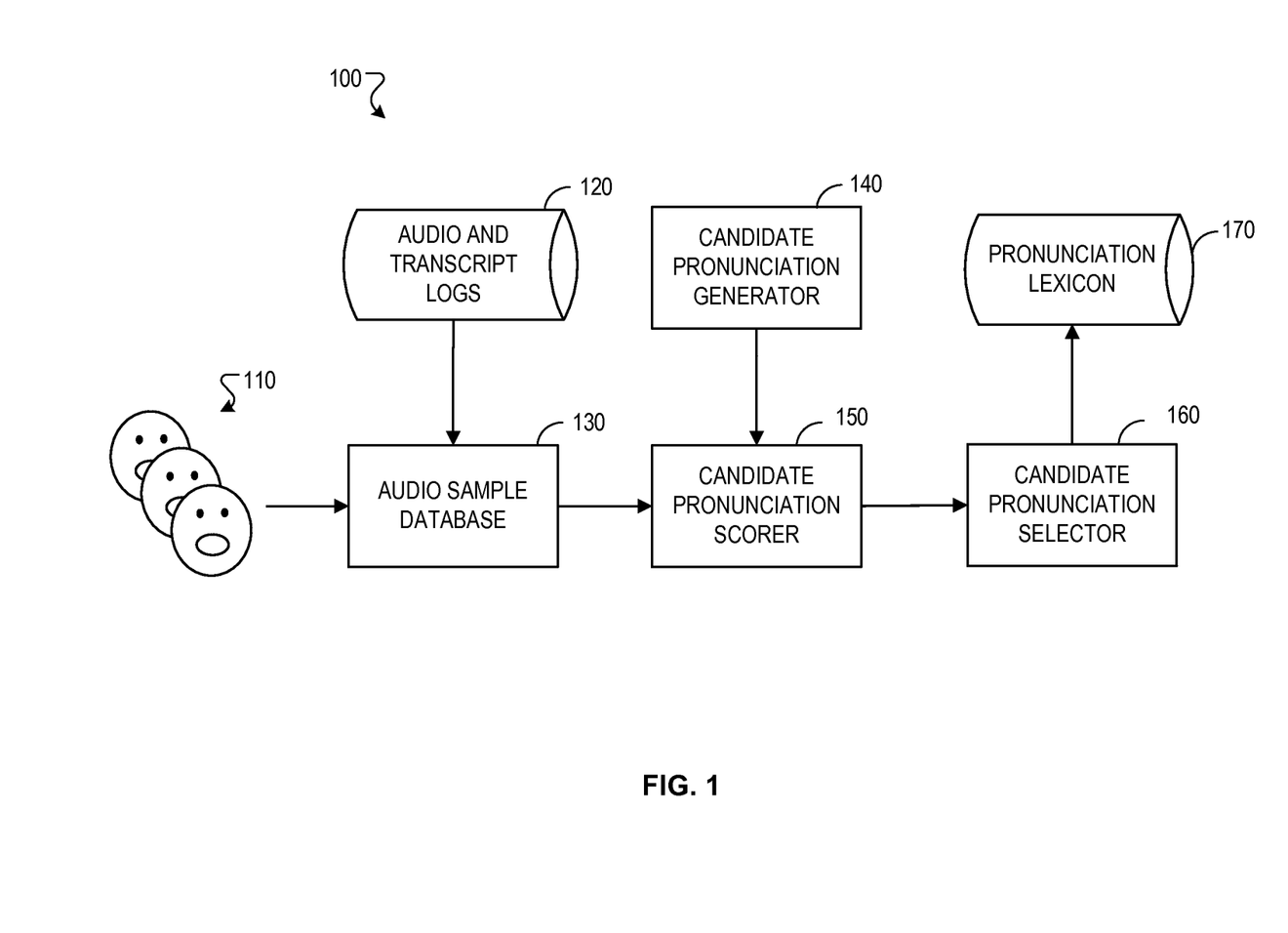
FIG. 1 is a block diagram of an example system for determining pronunciations for particular terms.

FIG. 1 is a block diagram of an example system 100 for determining pronunciations for particular terms. The system 100 may include an audio sample database 130. The database 130 may include audio samples of different people speaking the same particular term. The system 100 may prompt different users 110 to speak a particular term and store the recordings of the users 110 speaking the particular term as the audio samples for the particular term in the database 130. For example, the system 100 may display a prompt to users 110 "PLEASE SPEAK 'QUVENZHANE'," and store the recordings of users 110 speaking "QUVENZHANE" as the audio samples.

Additionally or alternatively, the system 100 may obtain the audio samples from audio and transcript logs 120. The system 100 may access transcriptions of voice query logs from different users to identify when the particular term is used in voice queries and use the corresponding portions of recordings of the voice queries as the audio samples. For example, the system 100 may identify a transcript log with the query, "HOW OLD IS QUVENZHANE WALLIS," includes the particular term "QUVENZHANE," and use the corresponding portion of the recording of the query as the audio sample. The audio and transcript logs 120 may be obtained by mining speech recognition logs where users manually corrected speech recognition results.

The system 100 may include a candidate pronunciation generator 140. The system 100 may obtain candidate pronunciations for particular terms from the generator 140. The generator 140 may analyze the letters, graphemes, or other units in the particular terms and apply one or more rules for pronouncing the letters to generate candidate pronunciations that represent alternative potential pronunciations for how the particular term sounds. For example, the generator 140 may determine that the particular term "QUVENZHANE" includes the grapheme "NE," and apply a rule that "NE" may be pronounced as "NAY" or "NE." Accordingly, the generator 140 may generate a first candidate pronunciation of "QUVENZHANE" as "QUE-VEN-ZHA-NE" and a second candidate pronunciation of "QUVENZHANE" as "QUE-VEN-ZHA-NAY."

The candidate pronunciation generator 140 may generate a predetermined maximum number of candidate pronunciations. When the candidate pronunciation generator 140 generates a predetermined maximum number of candidate pronunciations, the candidate pronunciation generator 140 may generate pronunciations based on applying pronunciation rules that are most likely to be applicable. For example, the candidate pronunciation generator 140 may apply only rules that are indicated as being most frequently correct for a particular grapheme. The rules may represent letter to phone sequences or grapheme to phone sequences. The candidate pronunciation generator 140 may learn the most likely to be applicable sequences based on learning from a list of terms and a pronunciation corpus that includes pronunciations of the terms in the list. The candidate pronunciation generator 140 may alternatively or additionally find the weakest phones and propose alternatives to replace the weak phones, e.g., as described below in regards to FIG. 2B. In proposing alternatives for weak phones, the candidate pronunciation generator 140 may determine the most likely to be applicable rules that have not yet been applied to the graphemes or letters corresponding to the weak phones, and apply those rules to the graphemes or letters to generate alternate candidate pronunciations.

The system 100 may include a candidate pronunciation scorer 150. The scorer 150 may generate scores reflecting levels of similarity between candidate pronunciations and audio samples. For example, the first candidate pronunciation "QUE-VEN-ZHA-NE" may be scored against the audio sample with the sound "KWAH-VEN-JA-NAY." The scorer 150 may determine that based on the differences in the sounds for the first candidate pronunciation and the audio sample, that the similarity is poor and assign a score of "0.4," where a score of "0" means no similarity, e.g., the sounds are completely different, and a score of "1.0" means a perfect similarity, e.g., the sounds are identical. The scorer 150 may also score portions, e.g., phonemes, of the candidate pronunciations as further described below in regards to FIGS. 2A and 2B.

The scorer 150 may aggregate the scores for each candidate pronunciation. For example, for a particular candidate pronunciation, the candidate pronunciation scorer 150 may average the scores for all the audio samples. Alternatively, the scorer 150 may apply some other algorithm to calculate an aggregated score, for example, calculating a median or mode.

The system may include a candidate pronunciation selector 160. The selector 160 may select one or more of the candidate pronunciations to be added to the pronunciation lexicon 170 based on the aggregated scores for the candidate pronunciations. For example, the selector 160 may select the candidate pronunciation that has the aggregated score that indicates the closest level of similarity between the candidate pronunciations and the audio samples, or add all of the candidate pronunciations along with their aggregated scores. When adding all candidate pronunciations to the pronunciation lexicon 170, the aggregated scores stored in the lexicon 170 may be used as weights when the pronunciations are used for recognizing speech. For example, an ASR may use an aggregated score, stored in the pronunciation lexicon 170 for a particular pronunciation, indicating a poor level of similarity as a weight against using the pronunciation. Alternatively, the selector 160 may determine that no candidate pronunciation has an aggregated score that is suitable and generate additional candidate pronunciations to score, as shown and further explained below in regards to FIGS. 2A and 2B.

Different configurations of the system 100 may be used where functionality of the audio sample database 130, the candidate pronunciation generator 140, the candidate pronunciation scorer 150, the candidate pronunciation selector 160, and the pronunciation lexicon 170 may be combined, further distributed, or interchanged. The system 100 may be implemented in a single device or distributed across multiple devices.

Figure 2A:
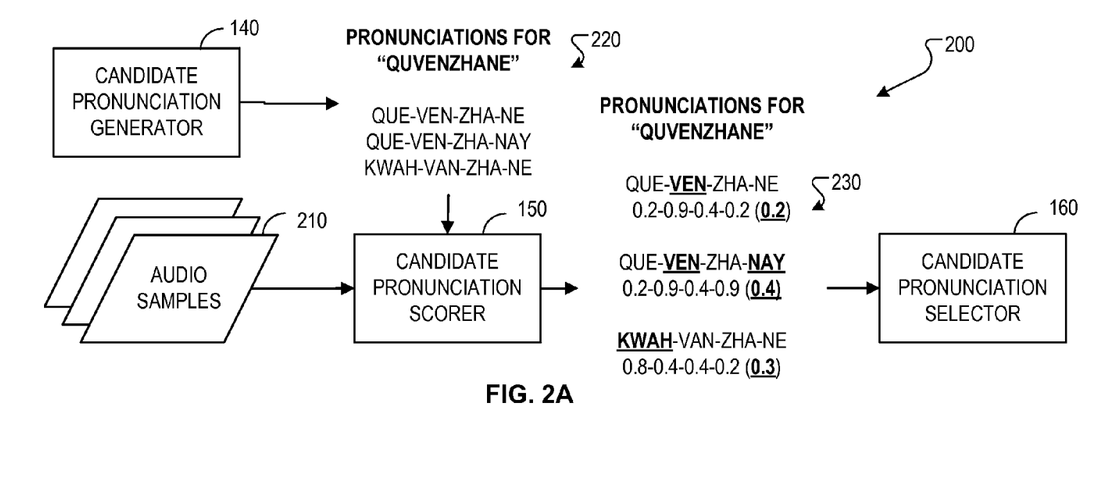
FIGS. 2A and 2B are block diagrams of the example system showing scoring of candidate pronunciations for a particular term.
Figure 2B:
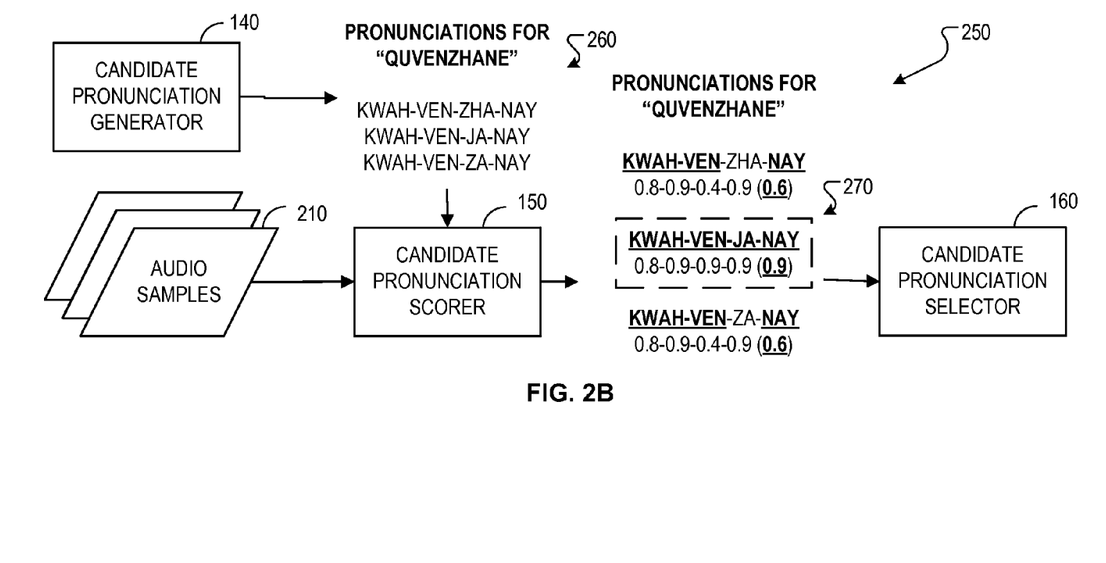

FIGS. 2A and 2B are block diagrams of the example system 200 and 250 showing scoring of candidate pronunciations for a particular term. In FIG. 2A, the candidate pronunciation generator 140 of system 200 generates candidate pronunciations 220 for a particular term. For example, the generator 140 may generate candidate pronunciations 220, "QUE-VEN-ZHA-NE," "QUE-VEN-ZHA-NAY," and "KWAH-VAN-ZHA-NE," for the term "QUVENZHANE."

A candidate pronunciation scorer 150 may obtain the generated candidate pronunciations 220 and audio samples 210. The audio samples 210 may be obtained from a database as described above. The scorer 150 may assign scores 230 to the candidate pronunciations. The scorer 150 may assign an overall score for each candidate pronunciation. For example, the scorer 150 may assign the candidate pronunciation "QUE-VEN-ZHA-NE" an overall score of "0.2." Additionally or alternatively, the scorer 150 may assign scores for individual phonemes in a candidate pronunciation. For example, the scorer 150 may assign scores of "0.2," "0.9," "0.4," and "0.2" for the phonemes "QUE," "VEN," "ZHA," "NE," respectively, in the candidate pronunciation "QUE-VEN-ZHA-NE." The overall score for a candidate pronunciation may be based on the individual scores of the phonemes in the candidate pronunciation. For example, the overall score of "0.2" of the candidate pronunciation, "QUE-VEN-ZHA-NE," may be based on the individual scores of "0.2," "0.9," "0.4," and "0.2" for the phonemes "QUE," "VEN," "ZHA," "NE."

The scorer 150 may calculate a score for each candidate pronunciation for the particular term and audio sample of speech corresponding to the particular term. For example, if there are three candidate pronunciations and four audio samples, the scorer 150 may calculate a total of twelve candidate pronunciations, four scores for each of the three candidate pronunciations. The scorer 150 may aggregate the scores for each candidate pronunciation. For example, for each candidate pronunciation, the scorer 150 may take the average of the scores from the different audio samples for the candidate pronunciation. The scorer 150 may also aggregate the scores for each phoneme for each candidate pronunciation. For example, the scorer 150 may calculate the score "0.2" for the phoneme "NE" in the candidate expression "QUE-VEN-ZHA-NE" by aggregating the scores for the phoneme "NE" from all four of the audio samples.

The candidate pronunciation selector 160 may obtain the candidate pronunciations and scores, and add one or more of the candidate pronunciations to a pronunciation lexicon based on the aggregated scores for the candidate pronunciations. The candidate pronunciation selector 160 may select to add the candidate pronunciation with the aggregated score that indicates the closest level of similarity between the candidate pronunciations and the audio samples, e.g., the highest aggregated score. For example, the selector 160 may determine that the candidate pronunciation "QUE-VEN-ZHA-NAY" has the highest aggregated score and add the candidate pronunciation "QUE-VEN-ZHA-NAY" to the pronunciation lexicon as the pronunciation for the term "QUVENZHANE." Alternatively, the selector 160 may add multiple candidate pronunciations along with their aggregated scores to the pronunciation lexicon. For example, the selector 160 may add all the candidate pronunciations along with their aggregated scores to the pronunciation lexicon as possible pronunciations for the particular term.

In some implementations, the selector 160 may determine if an aggregated score for a candidate pronunciation along with the audio samples reflects a closer level of similarity between the candidate pronunciation and the audio samples than levels of similarity between the other candidate pronunciations and the audio samples by a predetermined amount. The predetermined amount may be a subtractive difference between scores, e.g., the aggregated score is greater by at least "0.1," or a multiplicative difference, e.g., the aggregated score is at least 10% greater. For example, the selector 160 may determine that the highest aggregated score "0.4" for the candidate pronunciation "QUE-VEN-ZHA-NAY" is greater than the next highest aggregated score "0.3" by at least the predetermined amount of "0.1." Based on the determination, the selector 160 may add the candidate pronunciation "QUE-VEN-ZHA-NAY" to the pronunciation lexicon as a pronunciation for the term "QUVEN-ZHANE."

In some implementations, the selector 160 may determine if the aggregated score itself is greater than a predetermined threshold score. For example, the selector 160 may determine that the highest score is greater than a predetermined threshold score of "0.8." Based on the determination, the selector 160 may add the candidate pronunciation "QUE-VEN-ZHA-NAY" to the pronunciation lexicon. Alternatively, the selector 160 may add all candidate pronunciations along with their aggregated scores for all candidate pronunciations with an aggregated score above a predetermined threshold score.

If the selector 160 determines that no candidate pronunciation is to be added to the pronunciation lexicon based on the aggregated scores, e.g., that no aggregated score for a candidate pronunciation of the previous set reflects a level of similarity between the candidate pronunciation and the audio samples that is closer than levels of similarity between the other candidate pronunciations and the audio samples by a predetermined amount, the selector 160 may obtain additional candidate pronunciations based on the aggregated scores of the candidate pronunciations.

FIG. 2B illustrates a block diagram of the example system 250 showing scoring of additional candidate pronunciations for a particular term. In FIG. 2B, the candidate pronunciation generator 140 may generate additional candidate pronunciations 260 based on the aggregated scores of the candidate pronunciations 230 as shown in FIG. 2A. The generator 140 may receive indications of phonemes of the candidate pronunciations that may have a high level of similarity with audio samples 210. For example, the generator 140 may receive the aggregated scores where the aggregated score of "0.9" for the phoneme "VEN," the aggregated score of "0.9" for the phoneme "NAY," and the aggregated score of "0.8" for the phoneme "KWAH," which may indicate that phonemes all have a high level of similarity with the audio sample.

The generator 140 may generate additional candidate pronunciations 260 including the phonemes indicated as having a high level of similarity with the audio samples. For example, the generator 140 may generate candidate pronunciations including the phonemes "VEN," "NAY," and "KWAH." For example, the generator 140 may generate the candidate pronunciations "KWAH-VEN-ZHA-NAY," "KWAH-VEN-JA-NAY," and "KWAH-VEN-ZA-NAY."

The scorer 150 may then score the additionally generated candidate pronunciations and provide the aggregated scores along with the additionally generated candidate pronunciations to the candidate pronunciation selector 160, similarly as described above. The selector 160 may then select a candidate pronunciation from the additionally generated candidate pronunciations to add to the pronunciation lexicon, similarly as described above. For example, the selector 160 may select the candidate pronunciation "KWAH-VEN-JA-NAY" be added to the pronunciation lexicon.

Figure 3:
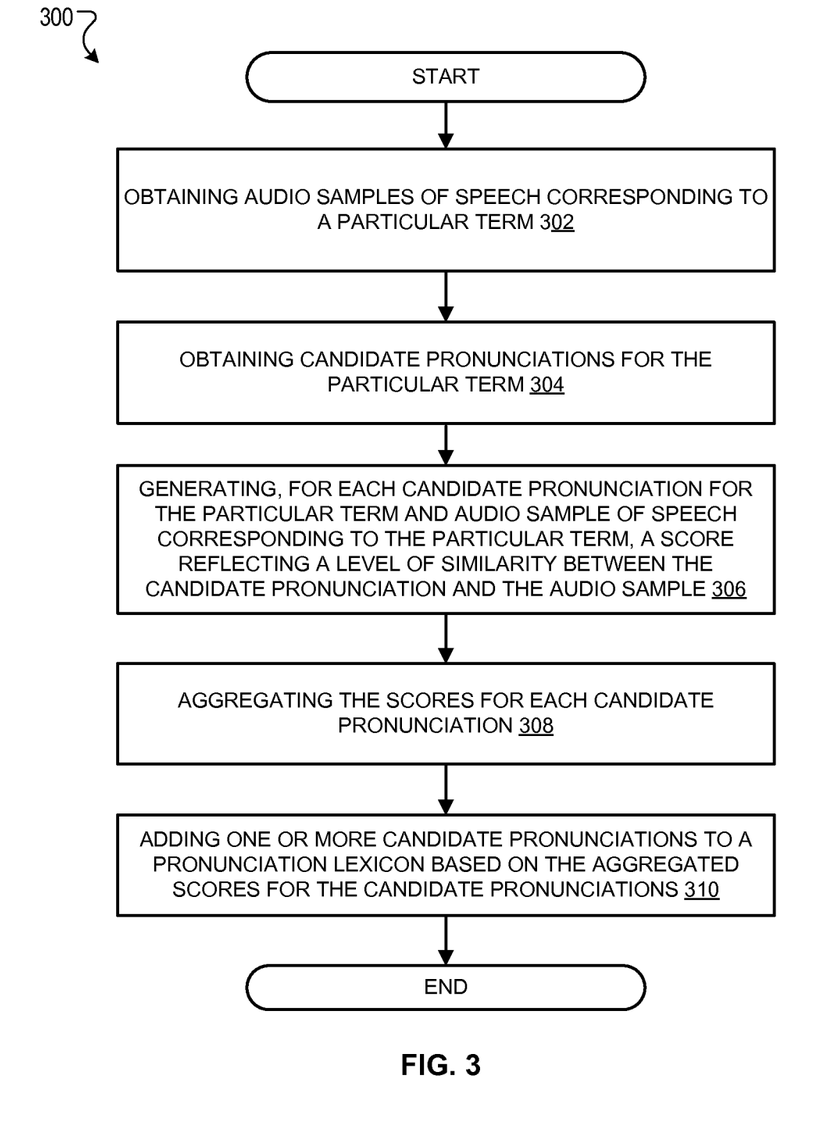
FIG. 3 is a flowchart of an example process for determining pronunciations for particular terms.

FIG. 3 is a flowchart of an example process for determining pronunciations for particular terms. The following describes the process 300 as being performed by components of the system 100 that are described with reference to FIG. 1. However, the process 300 may be performed by other systems or system configurations.

The process 300 may include obtaining audio samples (302). The audio sample database 130 may obtain audio samples from users 110 speaking the particular term in response to a prompt, or from audio and transcript logs 120, and the candidate pronunciation scorer 150 may obtain the audio samples from the database 130. For example, the database 130 may obtain audio samples for "QUVEN-ZHANE," and the scorer 150 may obtain the audio samples for "QUVENZHANE" from the database 130.

The process 300 may include obtaining candidate pronunciations (304). For example, referencing FIG. 2A, the generator 140 may obtain the particular term "QUVEN-ZHANE" and apply one or more rules for pronunciation to the letters in "QUVENZHANE" to generate the candidate pronunciation "QUE-VEN-ZHA-NE," "QUE-VEN-ZHA-NAY," and "KWAH-VEN-ZHA-NE." The scorer 150 may obtain the candidate pronunciations generated by the generator 140.

The process 300 may include generating scores reflecting levels of similarity between the candidate pronunciations and the audio samples (306). For example, the scorer 150 may generate a score for each candidate pronunciation and audio sample pair reflecting the levels of similarity between of the candidate pronunciation of the pair and the audio sample of the pair.

The process 300 may include aggregating the scores for each candidate pronunciation (308). For example, for each candidate pronunciation, the scorer 150 may aggregate the scores of the particular candidate pronunciation with the different audio samples.

The process 300 may include adding candidate pronunciations for the particular terms to a pronunciation lexicon (310). For example, the candidate pronunciation selector 160 may determine that the candidate pronunciation "QUE-VEN-ZHA-NAY" has an aggregated score of "0.4," which is greater than the aggregated score of all other candidate pronunciations by at least "0.1," and add the candidate pronunciation of "QUE-VEN-ZHA-NAY" into the pronunciation lexicon as a pronunciation for the term "QUVEN-ZHANE."

Figure 4:
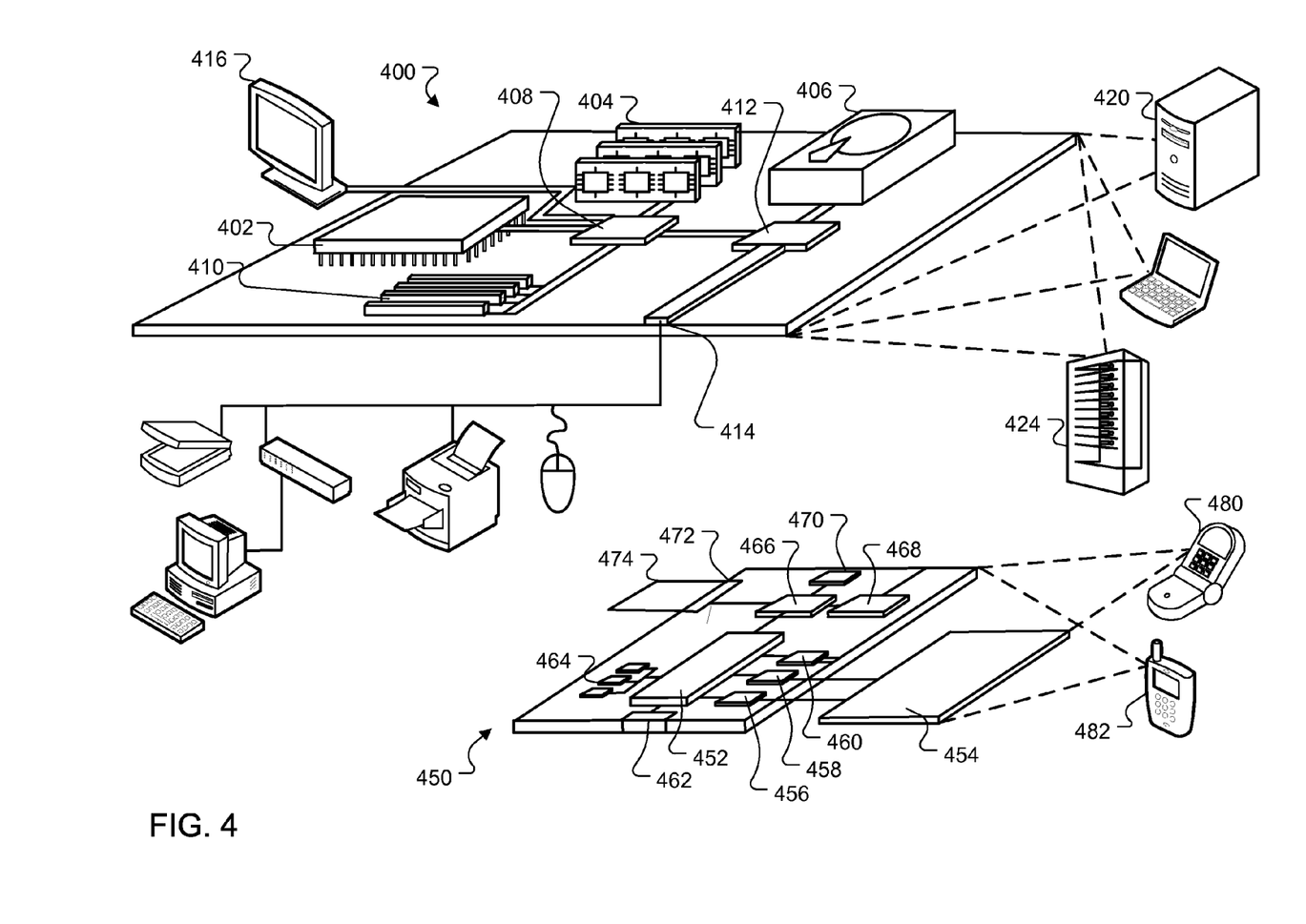
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
accessing a query transcription log;
identifying, in the query transcription log, manual corrections of automated speech recognizer generated transcriptions of a particular term;
identifying audio samples of speech corresponding to the manual corrections of the automated speech recognizer generated transcriptions of the particular term;
obtaining candidate pronunciations for the particular term;
generating, for each pair of the candidate pronunciations for the particular term and the audio samples of speech corresponding to the manual corrections of the automated speech recognizer generated transcriptions of the particular term, a score reflecting a level of similarity between the candidate pronunciation of the particular term and the audio sample corresponding to the manual correction of the automated speech recognizer generated transcription of the particular term, wherein the score of the candidate pronunciation for a particular term is obtained by using a minimum of individual scores of phonemes comprising the term;
aggregating the scores for each candidate pronunciation;
adding two or more candidate pronunciations for the particular term and the respective aggregated scores to a pronunciation lexicon based on the aggregated scores for the candidate pronunciations; and
generating a transcription using the two or more candidate pronunciations and respective aggregated scores for the particular term stored in the pronunciation lexicon to recognize an utterance of the particular term.

2. The method of claim 1, wherein adding two or more candidate pronunciations for the particular term comprises:
identifying a candidate pronunciation of the candidate pronunciations with an aggregated score that indicates a closer level of similarity between the candidate pronunciation and the audio samples than levels of similarity between the other candidate pronunciations and the audio samples; and
adding the candidate pronunciation that is identified to the pronunciation lexicon.

3. The method of claim 1, wherein obtaining the candidate pronunciations for the particular term comprises:
generating the candidate pronunciations for the particular term based on letters, graphemes, or other units, in the particular term and one or more rules for pronunciation.

4. The method of claim 1, further comprising:
determining the pronunciation lexicon does not include an accurate pronunciation for the particular term, wherein obtaining audio samples of speech corresponding to a particular term is in response to determining the pronunciation lexicon does not include an accurate pronunciation for the particular term.

5. A non-transitory computer-readable medium storing software comprising instructions executable by one or more computers which, upon such execution, cause the one or more computers to perform operations comprising:
accessing a query transcription log;
identifying, in the query transcription log, manual corrections of automated speech recognizer generated transcriptions of a particular term;
identifying audio samples of speech corresponding to the manual corrections of the automated speech recognizer generated transcriptions of the particular term;
obtaining candidate pronunciations for the particular term;
generating, for each pair of the candidate pronunciations for the particular term and the audio samples of speech corresponding to the manual corrections of the automated speech recognizer generated transcriptions of the particular term, a score reflecting a level of similarity between the candidate pronunciation of the particular term and the audio sample corresponding to the manual correction of the automated speech recognizer generated transcription of the particular term, wherein the score of the candidate pronunciation for a particular term is obtained by using a minimum of individual scores of phonemes comprising the term;
aggregating the scores for each candidate pronunciation;
adding two or more candidate pronunciations for the particular term and the respective aggregated scores to a pronunciation lexicon based on the aggregated scores for the candidate pronunciations; and
generating a transcription using the two or more candidate pronunciations and respective aggregated scores for the particular term stored in the pronunciation lexicon to recognize an utterance of the particular term.

6. The non-transitory medium of claim 5, wherein adding two or more candidate pronunciations for the particular term comprises:
identifying a candidate pronunciation of the candidate pronunciations with an aggregated score that indicates a closer level of similarity between the candidate pronunciation and the audio samples than levels of similarity between the other candidate pronunciations and the audio samples; and
adding the identified candidate pronunciation to the pronunciation lexicon.

7. A system comprising:
one or more computers and one or more storage devices storing instructions that are operable, when executed by the one or more computers, to cause the one or more computers to perform operations comprising:
accessing a query transcription log;
identifying, in the query transcription log, manual corrections of automated speech recognizer generated transcriptions of a particular term;
identifying audio samples of speech corresponding to the manual corrections of the automated speech recognizer generated transcriptions of the particular term;
obtaining candidate pronunciations for the particular term;
generating, for each pair of the candidate pronunciations for the particular term and the audio samples of speech corresponding to the manual corrections of the automated speech recognizer generated transcriptions of the particular term, a score reflecting a level of similarity between the candidate pronunciation of the particular term and the audio sample corresponding to the manual correction of the automated speech recognizer generated transcription of the particular term, wherein the score of the candidate pronunciation for a particular term is obtained by using a minimum of individual scores of phonemes comprising the term;
aggregating the scores for each candidate pronunciation;
adding two or more candidate pronunciations for the particular term and the respective aggregated scores to a pronunciation lexicon based on the aggregated scores for the candidate pronunciations; and
generating a transcription using the two or more candidate pronunciations and respective aggregated scores for the particular term stored in the pronunciation lexicon to recognize an utterance of the particular term.

8. The system of claim 7, wherein adding two or more candidate pronunciations for the particular term comprises:
identifying a candidate pronunciation of the candidate pronunciations with an aggregated score that indicates a closer level of similarity between the candidate pronunciation and the audio samples than levels of similarity between the other candidate pronunciations and the audio samples; and
adding the identified candidate pronunciation to the pronunciation lexicon.

* * * * *